US009906398B1

(12) United States Patent
Passaglia et al.

(10) Patent No.: US 9,906,398 B1
(45) Date of Patent: Feb. 27, 2018

(54) REMOTE MANAGEMENT OF DEVICE SETTINGS

(71) Applicant: Amazon Technologies, Inc., Reno, NV (US)

(72) Inventors: Abraham Martin Passaglia, Seattle, WA (US); Jason George McHugh, Seattle, WA (US); Omar Abdul Baki, Seattle, WA (US); Jonathan White Keljo, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 348 days.

(21) Appl. No.: 13/794,419

(22) Filed: Mar. 11, 2013

(51) Int. Cl.
*G06F 15/173* (2006.01)
*H04L 12/24* (2006.01)

(52) U.S. Cl.
CPC .................................. *H04L 41/00* (2013.01)

(58) Field of Classification Search
CPC ........... H04L 67/1095; G06F 17/30581; G06F 17/30578
See application file for complete search history.

(56) References Cited

U.S. PATENT DOCUMENTS

| | | | | |
|---|---|---|---|---|
| 5,872,928 A | * | 2/1999 | Lewis | H04L 41/0843 709/221 |
| 5,960,214 A | * | 9/1999 | Sharpe et al. | 710/15 |
| 7,139,817 B1 | * | 11/2006 | English | H04L 41/0813 709/220 |
| 2003/0159136 A1 | * | 8/2003 | Huang et al. | 717/171 |
| 2004/0002943 A1 | * | 1/2004 | Merrill et al. | 707/1 |
| 2005/0091346 A1 | * | 4/2005 | Krishnaswami | G06F 9/44505 709/220 |
| 2006/0184490 A1 | * | 8/2006 | Heim | G06N 5/025 706/46 |
| 2007/0093243 A1 | * | 4/2007 | Kapadekar et al. | 455/419 |
| 2007/0283011 A1 | * | 12/2007 | Rakowski et al. | 709/225 |
| 2010/0191835 A1 | * | 7/2010 | Mehta et al. | H04L 41/082 709/220 |
| 2012/0032945 A1 | * | 2/2012 | Dare | G06F 3/0481 345/418 |

* cited by examiner

*Primary Examiner* — Brian Whipple
*Assistant Examiner* — Anthony Rotolo
(74) *Attorney, Agent, or Firm* — Polsinelli LLP

(57) ABSTRACT

A settings service running on a server remote from a computing device can identify at least one settings group to which the computing device belongs. The settings service can identify all settings that are included in the at least one settings group to which the device belongs. The settings service can compare all the settings and detect any conflicting settings. If there are conflicting settings, the service can choose which of the conflicting settings takes priority, in order to resolve the conflict. For example, a default setting can be overridden by a setting with a higher priority. After resolving the conflict, the settings service can merge the conflicting setting(s) which takes priority, as well as the non-conflicting settings, into a single set of settings to be applied to the device. The settings service can transmit the set of settings to the computing device to be applied.

25 Claims, 9 Drawing Sheets

REMOTE MANAGEMENT OF DEVICE SETTINGS

BACKGROUND

Computing devices are becoming more commonplace and are used for a wide variety of purposes. Computing devices are increasingly having more functionality and customization capabilities. For example, a user of a computing device can manually adjust a brightness level for a display screen of the computing device, a ringtone for the device, or a current date and time for the device. In some cases, one or more configurations or settings can be exposed so as to be adjustable by a user, application, or other such entity. For example, an application running on a computing device can be enabled to adjust a configuration or setting of the device in order to change a specific behavior of the device. Examples of settings that can be manipulated by applications include (but are not limited to) time-outs, levels of logging, and uploaded metrics, among others. However, in order to cause different computing devices to behave in a desired manner, a device setting or configuration value must often be adjusted specifically for each particular computing device.

BRIEF DESCRIPTION OF THE DRAWINGS

Various embodiments in accordance with the present disclosure will be described with reference to the drawings, in which.

DETAILED DESCRIPTION

Figure 1:
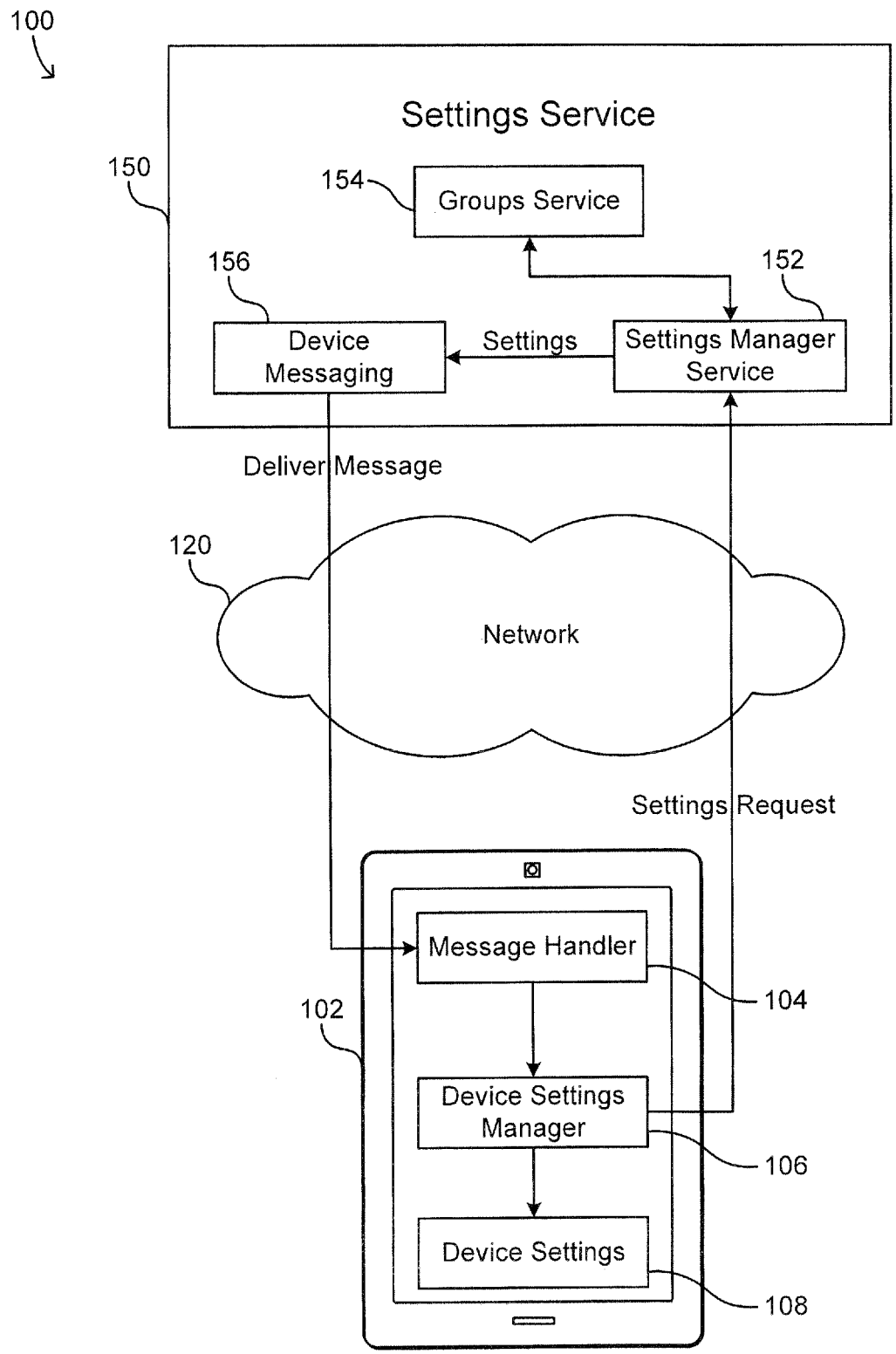
FIG. 1 illustrates an example environment in which aspects of the various embodiments can be utilized.

Systems and methods in accordance with various embodiments of the present disclosure overcome one or more of the above-referenced and other deficiencies in conventional approaches to configuring computing devices. In particular, various embodiments enable the remote management of various settings and/or configuration values for computing devices, as may utilize a service implemented on one or more servers that are remote from the one or more computing devices.

In some embodiments, there can be a settings service running on a server remote from (i.e external to) a computing device. The settings service can manage settings for various groups of computing devices, and can track various settings and setting changes that are associated with each group of devices. In other words, each group (i.e settings group) can include one or more device settings, and each computing device can belong to one or more groups, or in some instances might not correspond to any of the established groups. If an entity (e.g an application on a computing device, a developer of the application, a user of the computing device, etc.) wants to determine which settings are appropriate for a specific computing device, the entity can contact the settings service to identify all the groups to which the device belongs, and can collect or merge the settings associated with each of those groups. The merged settings then can be the appropriate set of settings for the specific computing device.

If there are any conflicts among the settings to be merged, the conflicts can be resolved using one or more conflict resolution policies or algorithms. For example, if two groups each have a setting with the same key (e.g name) but with different values, a determination should be made as to which value is to be used. In some embodiments, groups and/or settings can have associated priority rankings, and a settings service can select the value associated with the higher priority ranking.

In one example, a computing device can optionally request that one or more settings or setting updates be applied to the computing device (or a different device). A settings service can determine an identifier for the computing device to receive the settings, such as by identifying the device based on the model, type, and/or serial number of the device. Based at least in part on the identifier of the device, the settings service can determine all the settings groups to which the device belongs, as well as the settings that are associated with each of those groups. These settings can be "potential" settings that might be able to applied to the device; in other words, if these settings do not conflict with one another, then the settings can applied and/or implemented on the device. If two or more of the settings do conflict, then the settings service, in at least some embodiments, must resolve the conflict(s) and determine which of the potential settings can be applied to the device. The settings service can transmit a communication, to the device or another appropriate recipient, including a notification and/or data representing the settings that can be applied to the device.

As mentioned above, the computing device need not make the optional request. In some embodiments, a settings service can detect that one or more settings are available and appropriate for the device. The settings service can notify (e.g transmit a push notification to) the device, indicating that the one or more settings are available. In some embodiments, the settings service can automatically transmit the one or more settings to the device when appropriate (e.g when the device permits automatic settings transmission, when the device is idle, when the device has sufficient power, and/or when the device is connected to WiFi, etc.).

In some embodiments, the computing device can receive the one or more settings from the settings service. The computing device can store the received one or more settings in a central repository, for example, which can be accessed by various applications executing on the computing device. In some embodiments, each application executing on the device can cache a copy of at least a portion of the one or more settings for more efficient access.

Various other functions and advantages are described and suggested below as may be provided in accordance with the various embodiments.

FIG. 1 illustrates an example environment 100 in which aspects of the various embodiments can be utilized. The example environment 100 can include at least one computing device 102, a network 120, and a settings service 150. The computing device 102 can be any device capable of performing computational tasks, including (but not limited to) laptop/notebook computers, desktop computers, smartphones, or mobile/portable tablet computers. As shown in FIG. 1, the computing device 102 can comprise a message handler 104, a device settings manager 106, and device settings 108. Moreover, the computing device 102 can communicate with the settings service 150 through a network 120, such as the Internet.

The settings service 150 can be implemented on one or more servers located across at least one network from the computing device 102 (i.e a server(s) external to the computing device 102, a backend server(s), etc.). The settings service 150 can enable remote management of device settings for the computing device 102 (e.g without having to manually and directly interact with the computing device 102). In one example, the settings service 150 can provide access for authorized personnel (e.g system administrators, software developers) to manage settings (i.e configurations) for the computing device 102, without requiring software developers to directly and/or specifically interact with the computing device 102 to implement a change. This can, for example, reduce the need to program and/or implement code on the computing device 102 in order to configure and/or manage the settings of the computing device 102. In some embodiments, the remote management of device settings can be implemented utilizing one or more settings groups. A settings group can be associated with, or include, one or more specific settings that are to be applied to devices that are members of the settings group. The settings service 150 can provide access to manage various settings groups, in order to perform functions such as creating settings groups, removing settings groups, editing settings groups, etc. In one example, authorized personnel can specify which setting(s) is to be included in which settings group(s). Moreover, the authorized personnel can specify which device(s) belong to which settings group(s). Adjusting the settings, settings groups, and/or device memberships/associations, improves the ability to easily and effectively manage device settings from a remote location.

As illustrated in the example of FIG. 1, a settings service 150 can comprise components such as a settings manager service 152, a groups service 154, and a device messaging component 156. In one example, the computing device 102 can send, to the settings service 150, a request for one or more settings (e.g one or more settings updates/changes). In some embodiments, the computing device 102 can periodically poll the settings service 150 to determine whether or not there are any settings (e.g settings updates) to be applied tor the computing device 102. Further, in some embodiments, an application or a user of the device 102 can initiate the request for device settings to be applied to a specific device or devices. A settings manager service (i.e settings manager) 152 can be configured to handle such a request. The settings manager 152 can receive the request (e.g periodic poll, application initiated, user initiated, etc.) and, in response to the request, determine an identity of the device 102. In some embodiments, the identity of the device 102 can, for example, be based on information such as the model of the device 102, the device type, and/or the device's serial number, etc. In one example, the identity of a device can be derived from the fact that the device(s) is a 32 GB model, tablet-type device. In another example, the identity of a device can be a serial number, such as 12345ABCD.

Having determined the identity of the device 102, the settings manager 152 can communicate with the groups service 154 to determine any settings groups with which the device 102 is associated (e.g any groups to which the device 102 belongs). Each group can be associated with (e.g can include) one or more settings. The one or more settings included in a group to which the device 102 belongs can be potential settings that can be applied to the device 102. However, there can be conflicts among the potential settings, as mentioned above such as where two settings, if applied to the device, would attempt to cause the device to be configured in two conflicting ways. As such, any conflict among the settings to be applied to the device 102 can be resolved by utilizing a conflict resolution algorithm, for example, which can be implemented by the settings manager 152 prior to the settings being applied to the device 102. Based at least in part upon results of the conflict resolution algorithm, the settings (if any) to be applied to the device 102 can be determined.

In some embodiments, each of the one or more settings can comprise a key component and a value component, or key-value pair. The key component (i.e key) of each setting can relate to how the setting can be identified, located, called, addressed, and/or written to, etc. For example, the key of a setting can refer to a name of the setting and can be stored as a string data type. The value component can refer to the value associated with the setting and can be stored as a string, character, Boolean, integer, float, or other data type. For example, a setting having a key of "HS_TIMEOUT" can have a value of "30"; this setting relates to a device configuration in which the home screen of the device would lock after a time of 30 seconds. As such, if the HS_TIMEOUT setting is present in two different settings groups to which a device belongs, but the HS_TIMEOUT setting has a different value (e.g "30" and "60") in each of the two groups, then the conflict (e.g different values "30" and "60") must be resolved. In other words, it must be determined whether the "30" value or the "60" value should be applied as the HS_TIMEOUT setting for the device.

Continuing with the example, having determined which settings (if any) to apply to the device 102, the settings manager 152 can work with the device messaging component 156 to deliver a communication (i.e message) to the device 102 regarding whether or not any settings are available to be applied to the computing device 102, as well as identifying any such settings. Moreover, some communications can include a transmission of the settings that are to be applied.

The communication can be received by the device 102. In some embodiments, a message handler 104 can decipher, interpret, and/or parse the communication and pass information for the communication to the device settings manager 106. For example, the message handler 104 can determine that the communication indicates that no settings are available to the device, and can pass this indication to the device settings manager 106. In another example, the message handler 104 can determine that the communication includes the transmission of the settings to be applied to the device 102, and can pass the settings to the device settings manager 106. In some embodiments, the message handler 104 can be at least partially incorporated within the device settings manager 106.

The device settings manager 106 can be a primary component for handling and/or processing the communication and/or the settings transmitted from the settings service 150. If settings are transmitted, the device settings manager 106 can process and implement the settings with respect to the device 102. The processed and implemented device settings 108 can determine the behavior and/or configuration of the device 102.

In some embodiments, the settings service 150 can detect that settings are available for the device 102 and push a notification and/or send a transmission of the settings to the device 102. For example, the device 102 can permit an automatic setting update option such that the device 102 can be continuously updated with available settings.

Figure 2:
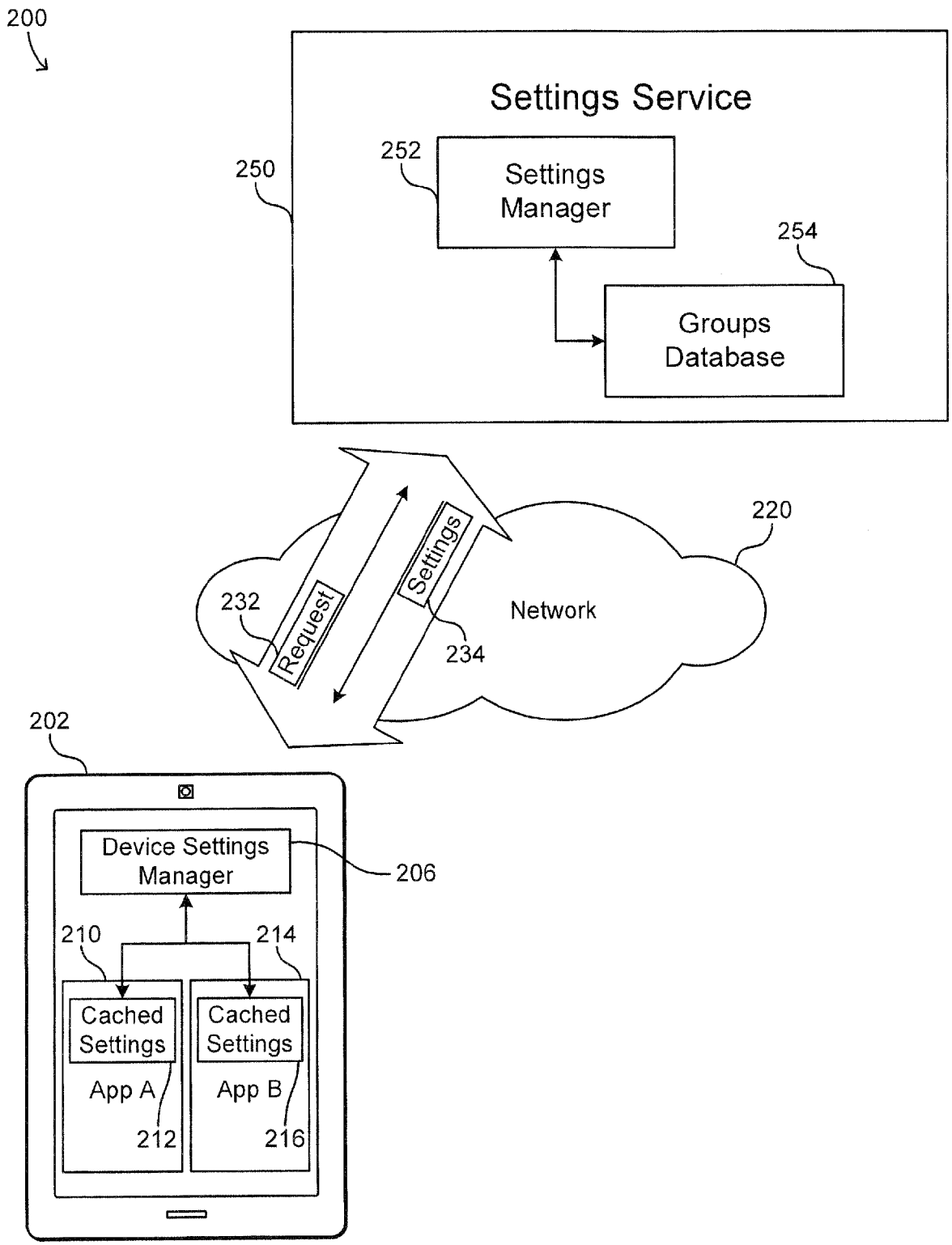
FIG. 2 illustrates an example system embodiment for remote management of device settings.

FIG. 2 illustrates an example system embodiment 200 for remote management of device settings. The example system embodiment 200 of FIG. 2 can comprise at least one computing device 202 and a settings service 250. The at least one computing device 202 and the settings service 250 can be configured to communicate with one another over at least one network 220, such as the Internet, a local area network, or a cellular network, among others.

The computing device 202 can comprise a device settings manager 206. In some embodiments, the device settings manager 206 can comprise a central repository (e.g electronic database) configured to store one or more settings to be applied to the device 202. The computing device 202 can also include one or more applications, such as App A 210 and App B 214. The one or more applications can be any type of application, process, thread, program, software, etc. In some embodiments, each of the applications (e.g 210 and 214) included on the device 202 can generate a cached copy (e.g 212 and 216 respectively) of at least a portion of the settings stored with the device settings manager 206 (e.g stored in the central repository of the device settings manager 206). This can be beneficial to the applications because the applications can access the setting(s) locally via the cached copy without having to make a lengthier call to the device settings manager 206. Nonetheless, in some embodiments, applications can still access the settings stored on the device settings manager 206 if necessary. In some embodiments, applications can access the settings stored with the device settings manager 206 and do not need to cache local copies of the settings.

As illustrated in FIG. 2, the settings service 250 can comprise a settings manager 252 and a groups database 254. The groups database 254 can store one or more settings groups. Each of the one or more settings groups can be associated with at least one device setting and at least one computing device. In some embodiments, the groups database 254 can be at least partially incorporated within the groups service 154.

The settings manager 252 can be a primary component for handling and/or processing remote management of device settings in at least some embodiments. The settings manager 252 can facilitate the identification of computing devices, as well as determining which of the computing devices is associated with (e.g belongs to) which settings group(s). The settings manager 252 can also facilitate in managing the settings associated (e.g included in) each settings group. Moreover, the settings manager 252 can implement a conflict resolution algorithm to resolve any conflict(s) among settings. For example, a conflict resolution algorithm for multiple conflicting settings can prioritize the setting that was created or updated most recently, or that belongs to a group with the most recently created or updated settings group. In another example, the conflict resolution algorithm can take into account a hierarchy of the settings and/or of the settings groups. In a further example, the conflict resolution algorithm can generate an error message providing information about the conflict, without making an effort to otherwise resolve the conflict.

In one example, the computing device 202 can send a request 232 to the settings service 250 for one or more settings. The request 232 can be part of a periodic poll performed by the device 202, a request initiated by an application of the device 202, a request initiated by a user of the device 202, or some other settings request. Based at least in part on information sent with the request 232, the settings manager 252 can determine an identification of the device 202. Based at least in part on the identification, the settings manager 252 can communicate with the groups database 254 to identify any settings groups that are associated with the device 202. Then the settings manager 254 can determine which of the settings in the settings groups are applicable to the device 202, which can include determining which setting out of a set of multiple conflicting settings is to take priority over the other settings. In some embodiments, there can be multiple sets of conflicting settings such that one setting is determined to take priority in each of the multiple sets.

Continuing with the example, having determined which setting(s) is (are) applicable to the device 202, the settings service 250 can transmit a communication 234 to the device 202. The communication can include at least one of an indication of whether or not any settings are available for the device 202, an indication of which settings are available, if any, for the device 202, and/or a transmission of the settings that are available for the device 202.

In another example, the settings service 250 (e.g the settings manager 252) can detect that one or more settings (e.g one or more settings updates/changes) are available for the device 202. In some embodiments, the settings manager 252 can send a message 234 (e.g transmit a push notification) to notify the device 202 of the availability of the settings. In some embodiments, the settings manager 252 can automatically transmit (e.g push), via the message 234, the available settings to the device 202. In some embodiments, the device 202 must be in a state suitable for receiving the settings included in the message 234 (e.g the device must be plugged in, have sufficient battery life, connected to the network 220 via WiFi, have a locked screen, idle, etc.).

Figure 3A:
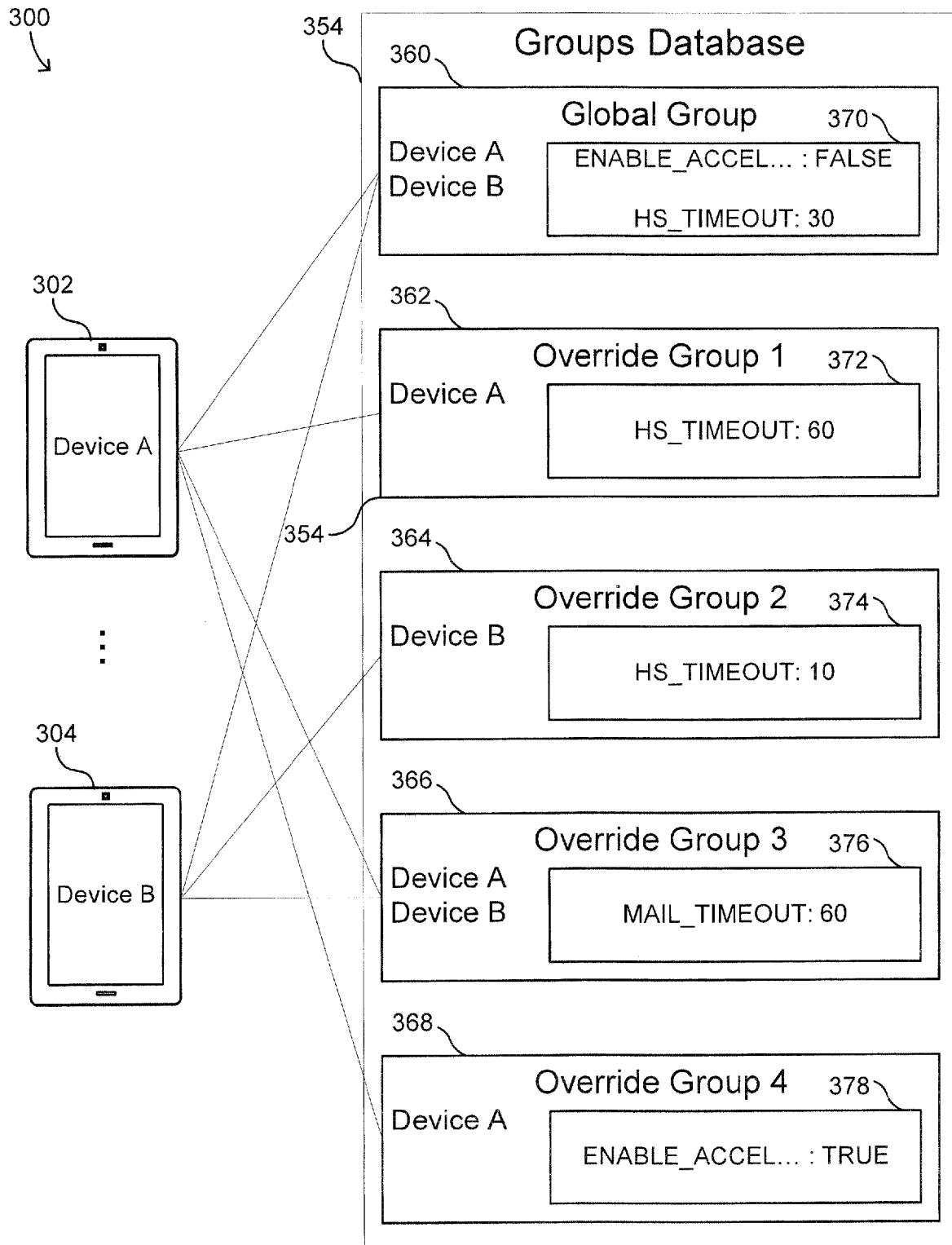
FIG. 3A illustrates an example system embodiment for remote management of device settings.
Figure 3B:
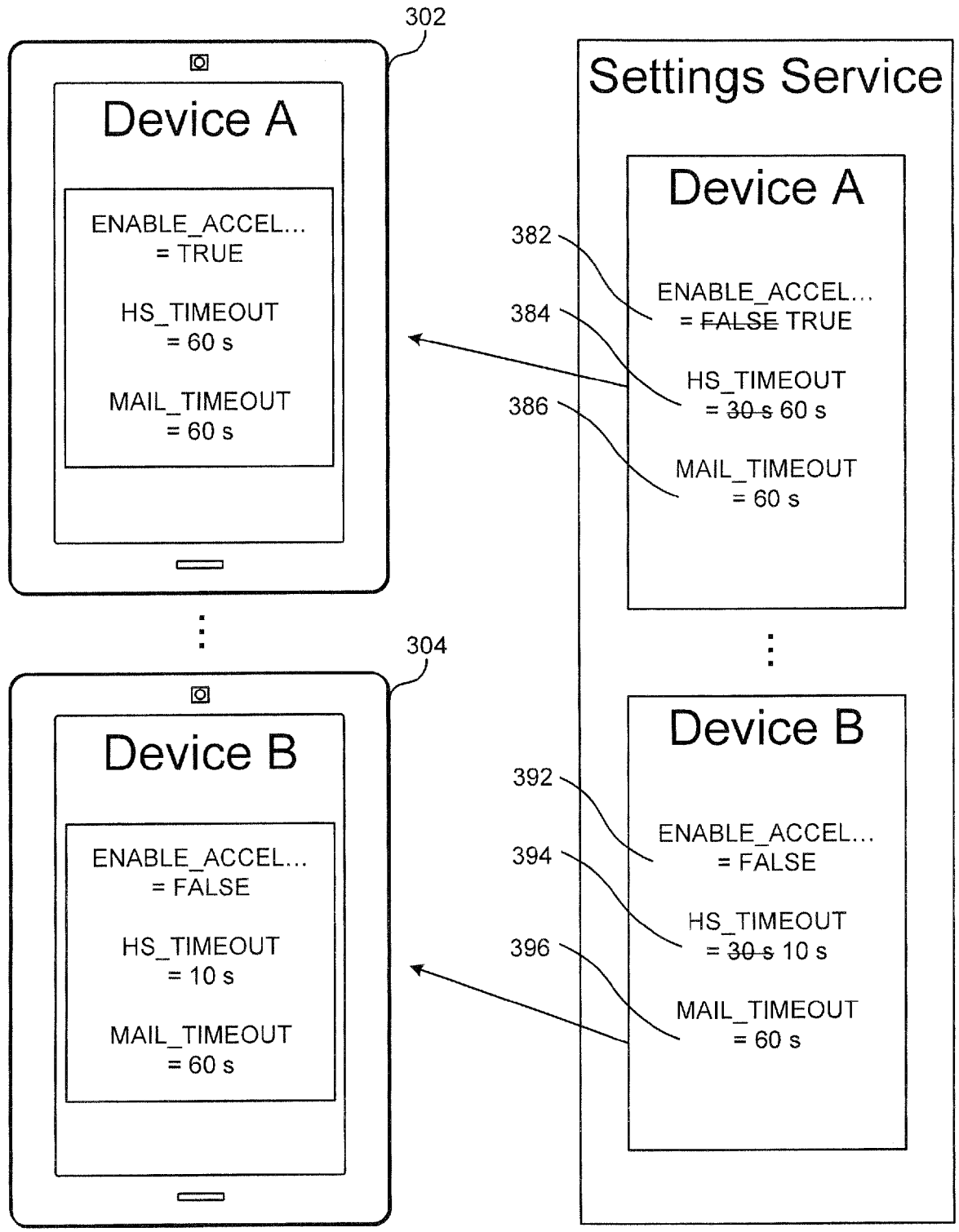
FIG. 3B illustrates an example system embodiment for remote management of device settings.

FIG. 3A and FIG. 3B each illustrates an example system embodiment 300 for remote management of device settings. In the example system embodiment 300, there can be multiple computing devices (e.g 302, 304, etc.) and a groups database 354 associated with a settings service. As shown in FIG. 3A, there can be multiple settings groups (e.g 360, 362, 364, 366, 368, etc.) included with the groups database 354. Each settings group can also be associated with computing devices (e.g can have devices as members). In some embodiments, there can be a Global Group 360, which can be a default group that is associated (i.e logical associated, not necessarily physically associated) with all the computing devices (e.g all devices are (logical) members of Global Group 360). In some embodiments, the Global Group 360 can be prioritized lower than other groups. If the settings groups are organized in a group hierarchy, the Global Group 360 can be the lowest in the hierarchy. In other words, in some embodiments, if a setting in the Global Group 360 conflicted with a setting in another group, the setting in the other group can take priority.

As shown in FIG. 3A, there can also be other groups, such as Override 1 (362), Override 2 (364), Override 3 (366), Override 4 (368), and so on. In the example of FIG. 3A, the members of Override 1 (362) can include computing device A 302. The members of Override 2 (364) can include computing device B 304. Override 3 (366) can include device A 302 and device B 304. Override 4 (368) can include device A 302.

Moreover, as shown in the example of FIG. 3A, each settings group can also be associated with (e.g can include) one or more settings. Global Group (360) can include the settings 370 "ENABLE_ACCELERATION: FALSE" and "HS_TIMEOUT: 30". Override 1 (362) can include the setting 372 "HS_TIMEOUT: 60". Override 2 (364) can include the setting 374 "HS_TIMEOUT: 10". Override 3 (366) can include the setting 376 "MAIL_TIMEOUT: 60". Override 4 (368) can include the setting 378 "ENABLE_ ACCELERATION: TRUE". Each setting in each settings group can be a potential setting that might be able to be applied to the one or more computing devices, if any, in each settings group. If there are conflicts among settings, the conflicts should be resolved. In other words, if multiple (two or more) settings have the same key but different values, the settings service can decide (e.g utilizing at least one conflict resolution algorithm) which value is to be applicable.

For example, the setting service can determine which groups are associated with a particular computing device. In the example of FIG. 3A and FIG. 3B, device A 302 is associated with (e.g is a member of) the Global Group, Override Group 1, Override Group 3, and Override Group 4. As such, all settings in these settings groups will be potentials for being applied to device A 302. In other words, the settings "ENABLE_ACCELERATION: FALSE", "HS_TIMEOUT: 30", "HS_TIMEOUT: 60", "MAIL_TIMEOUT: 60", and "ENABLE_ACCELERATION: TRUE" are potential settings that can be possibly implemented on device A 302. However, the setting service can detect that there are two conflicts which must be resolved. The setting "ENABLE_ACCELERATION: FALSE" from Global Group and "ENABLE_ACCELERATION: TRUE" from Override Group 4 are in conflict, because the two settings have the same key ("ENABLE_ACCELERATION") but different values ("FALSE" and "TRUE"). Similarly, "HS_TIMEOUT: 30" from Global Group and "HS_TIMEOUT: 60" from Override Group 1 are in conflict. Since the Global Group is lower in priority (e.g lower priority ranking) than each of Override Group 1 and Override Group 4, the settings service will choose the settings from Override Group 1 and Override Group 4 instead of those from Global Group in order to resolve the conflicts. Accordingly, for device A 302, "HS_TIMEOUT: 60" from Override Group 1 will replace "HS_TIMEOUT: 30" from Global Group, and "ENABLE_ACCELERATION: TRUE" from Override Group 4 will replace "ENABLE_ACCELERATION: FALSE" from Global Group, as shown in FIG. 3B. Also, "MAIL_TIMEOUT: 60" from Override Group 2 will be applied to device A 302 since there is no conflict for "MAIL_TIMEOUT". Therefore, the resulting settings to be applied for device A 302 will be "ENABLE_ACCELERATION: TRUE" (382), "HS_TIMEOUT: 60" (384), and "MAIL_TIMEOUT: 60" (386), as illustrated in FIG. 3B.

Regarding device B 304, device B 304 is associated with (e.g is a member of) the Global Group, Override Group 2, and Override Group 3. As such, all settings in these settings groups will be potentials for being applicable to device B 304. In other words, the settings "ENABLE_ACCELERATION: FALSE", "HS_TIMEOUT: 30", "HS_TIMEOUT: 10", and "MAIL_TIMEOUT: 60" are potential settings that can be possibly implemented on device B 304. However, the setting service can detect that there is a conflict which must be resolved. The setting "HS_TIMEOUT: 30" from Global Group and "HS_TIMEOUT: 10" from Override Group 3 are in conflict, because the two settings have the same key ("HS_TIMEOUT") but different values ("30" and "10"). Since the Global Group is lower in priority than Override Group 3, the settings service will choose the setting from Override Group 3 instead of that from Global Group in order to resolve the conflict. Accordingly, for device B 304, "HS_TIMEOUT: 10" from Override Group 3 will replace "HS_TIMEOUT: 30" from Global Group. Also, "ENABLE_ ACCELERATION: FALSE" from Global Group and "MAIL_TIMEOUT: 60" from Override Group 2 will be applied to device B 304 since there are no conflicts for "ENABLE_ACCELERATION" and "MAIL_TIMEOUT". Therefore, the resulting settings to be applied for device B 304 will be "ENABLE_ACCELERATION: FALSE" (392), "HS_TIMEOUT: 10" (394), and "MAIL_TIMEOUT: 60" (396), as illustrated in FIG. 3B.

In some embodiments, there can be a conflict among multiple non-global groups, such as non-default groups, Override groups, and the like. There can be various options for managing conflicts among multiple non-global groups that a person of ordinary skill in the art would recognize. For example, the non-global group to take priority can be the group whose setting(s) is received first in time. In another example, the non-global group that takes priority can be selected to be the group that has a settings value most similar to that of the global/default group.

Figure 4:
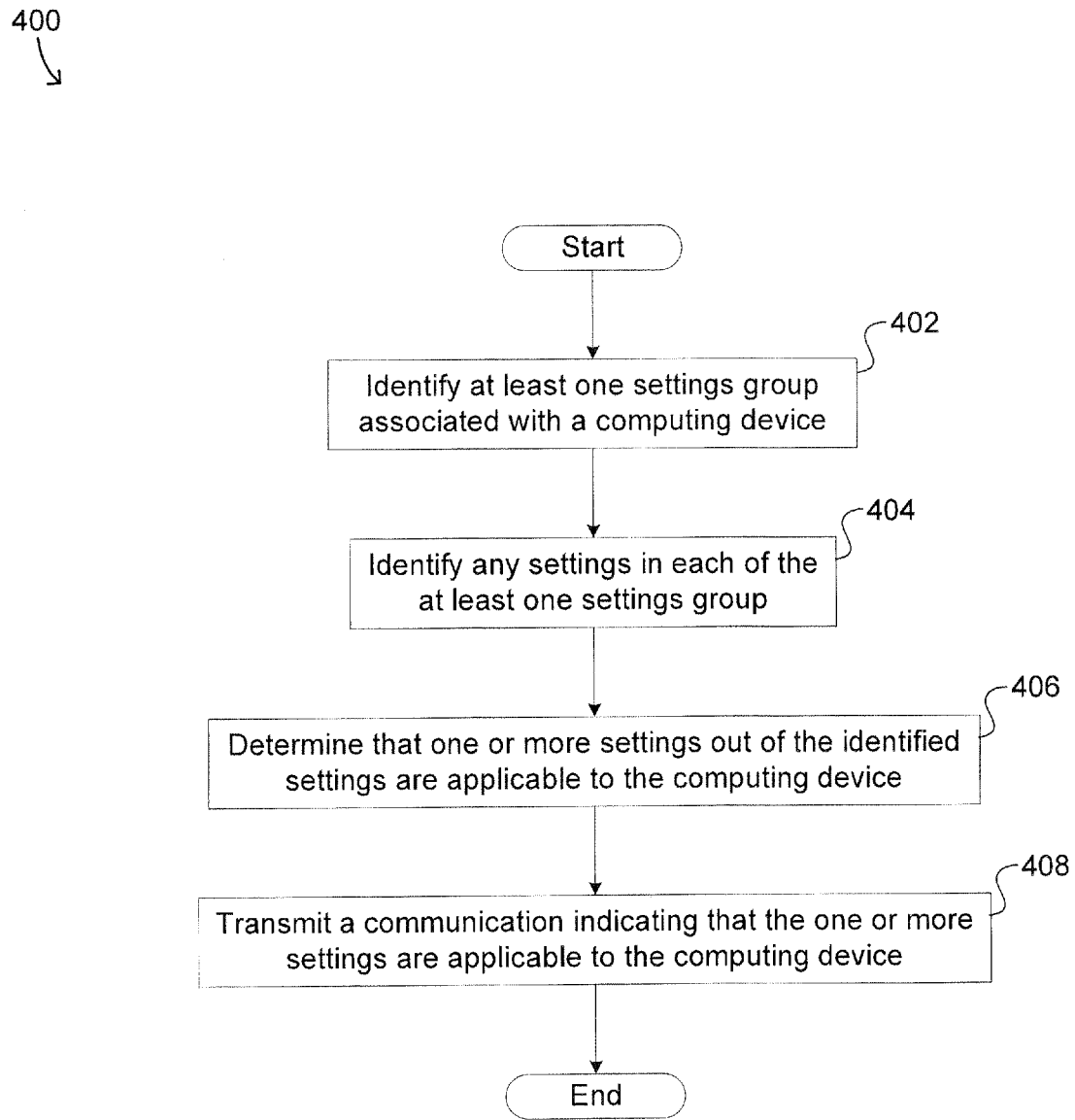
FIG. 4 illustrates an example method embodiment for remote management of device settings.

FIG. 4 illustrates an example method embodiment 400 for remote management of device settings. It should be understood that there can be additional, fewer, or alternative steps performed in similar or alternative orders, or in parallel, within the scope of the various embodiments unless otherwise stated. The example method embodiment 400 can start with identifying at least one settings group with which a computing device is associated, at step 402. At step 404, the example method 400 can identify any settings included in each of the at least one settings group with which the computing device is associated. Step 406 can include determining that one or more settings out of the identified settings are applicable to the computing device. Then at step 408, the method can transmit to the computing device a communication indicating that the one or more settings out of the identified settings are applicable to the computing device.

Figure 5:
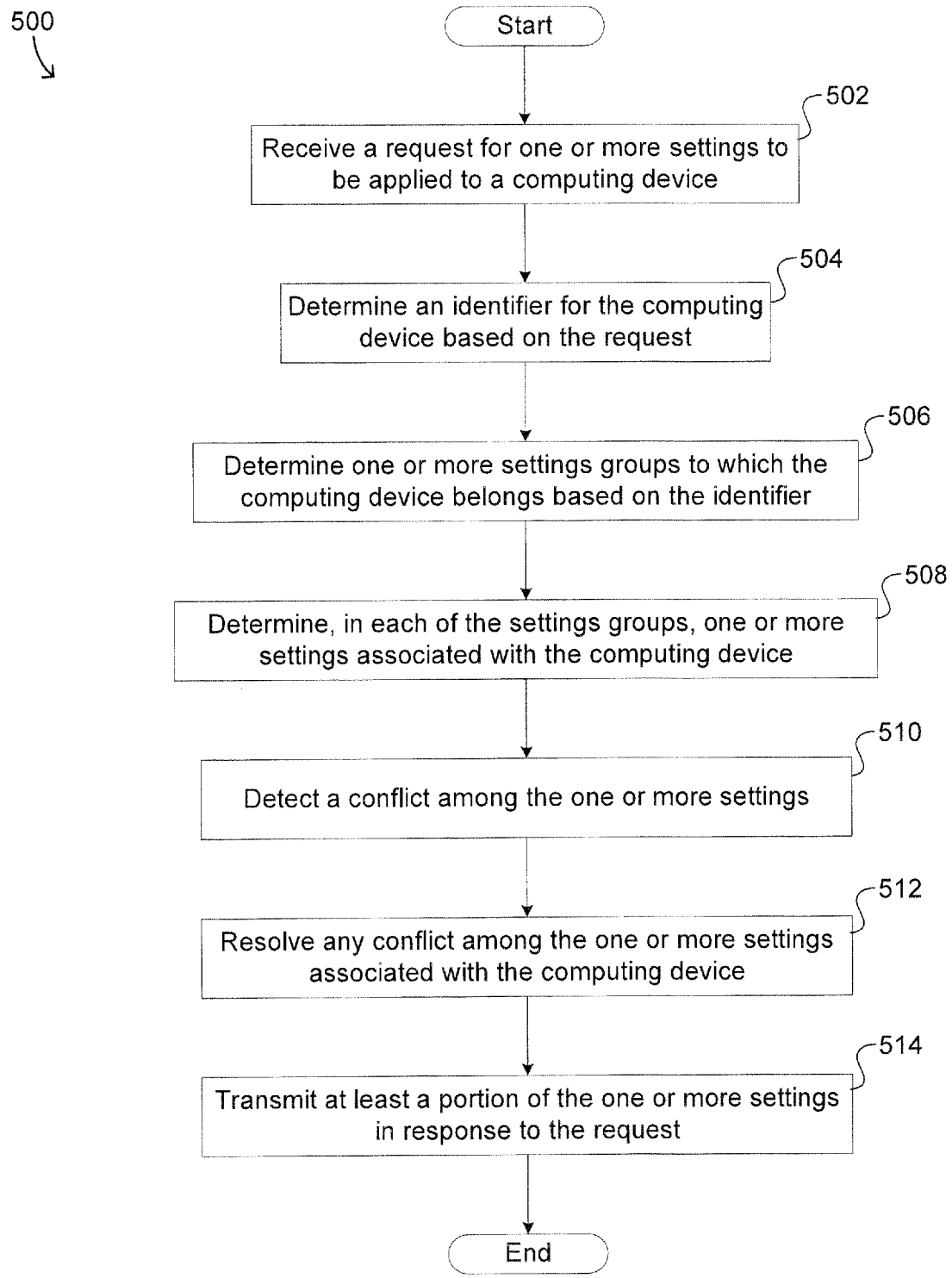
FIG. 5 illustrates an example method embodiment for remote management of device settings.

FIG. 5 illustrates an example method embodiment 500 for remote management of device settings. It should be understood that there can be additional, fewer, or alternative steps performed in similar or alternative orders, or in parallel, within the scope of the various embodiments unless otherwise stated. The example method embodiment 500 can start with receiving, from a computing device, a request for one or more settings to be applied to the computing device, at step 502. The request can be associated with a periodic poll, an application initiated request, and/or a user initiated request. At step 504, the example method 500 can determine an identifier for the computing device based at least in part upon the request. Step 506 can include determining one or more settings groups to which the computing device belongs based at least in part on the identifier for the computing device.

Then at step 508, the method 500 can determine, in each of the one or more settings groups to which the computing device belongs, one or more settings that are associated with the computing device. Step 510 can include detecting at least one conflict among the one or more settings that are associated with the computing device. Step 512 can include resolving, using at least one conflict resolution algorithm, any conflict among the one or more settings that are associated with the computing device. The example method 500 can transmit, to the computing device, at least a portion of the one or more settings in response to the request, at step 514.

Figure 6:
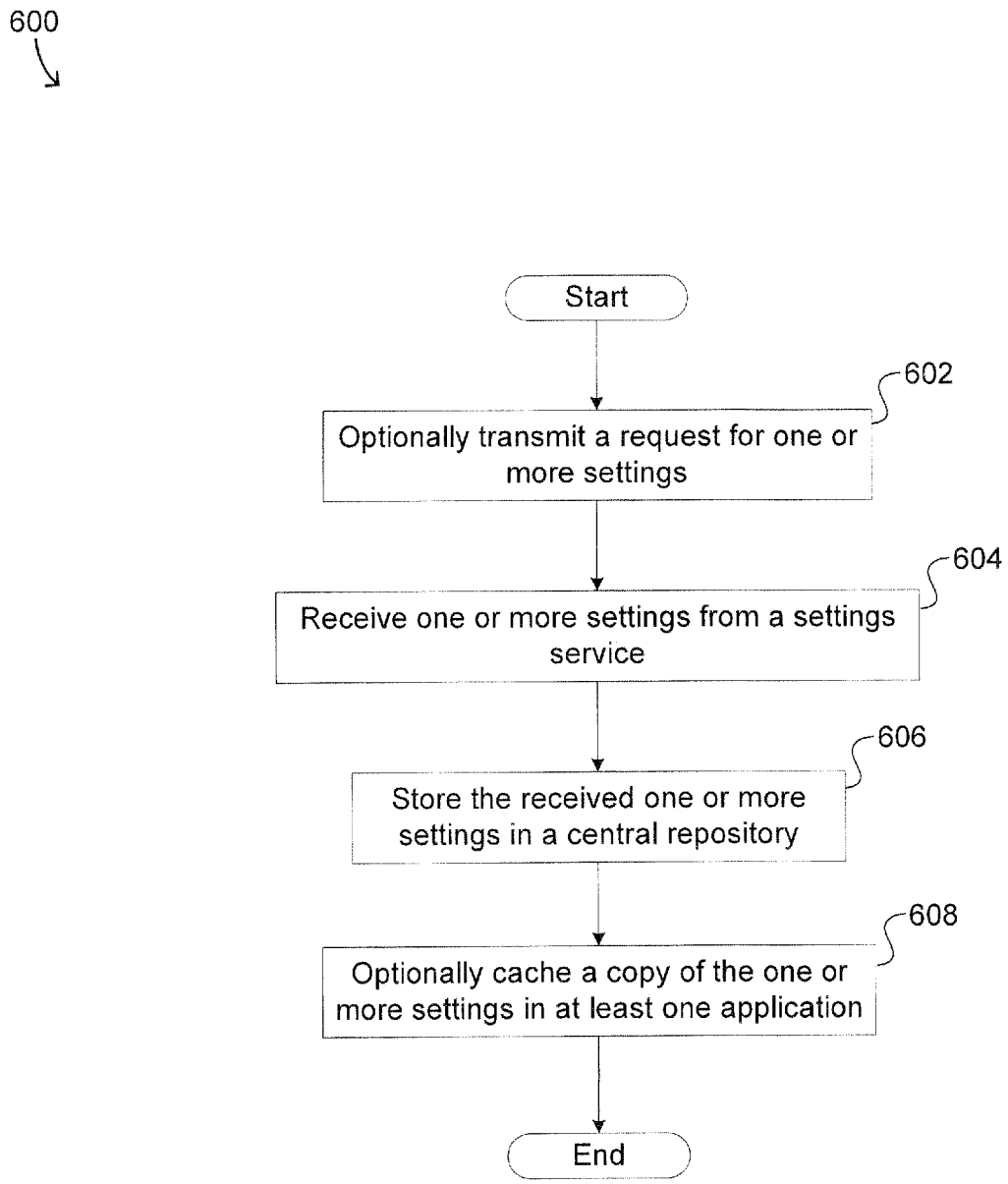
FIG. 6 illustrates an example method embodiment for remote management of device settings.

FIG. 6 illustrates an example method embodiment 600 for remote management of device settings. Again, it should be understood that there can be additional, fewer, or alternative steps performed in similar or alternative orders, or in parallel, within the scope of the various embodiments unless otherwise stated. At step 602, the example method embodiment 600 can optionally transmit, by a computing device, a request for one or more settings applicable to the computing device. At step 604, the example method 600 can receive, at the computing device, one or more settings from a settings service. The method 600 can store the received one or more settings in a central repository of the computing device, at step 606. Step 608 can involve optionally caching a copy of the one or more settings stored in the central repository, the copy being cached in at least one application running on the computing device. In some embodiments, the settings can be cached, or otherwise stored, without requiring a specific instruction from an application developer. Typically, an application developer requests caching (a copy) of the settings. However, the present technology enables local caching of the settings such that the settings can be managed automatically (e.g there can be a periodic poll by the central repository, or an application that listens for when settings have changed or new settings are available, and then obtains those settings).

In some embodiments, at least some of the various embodiments of the present disclosure can be utilized during the development phase of a piece of software. For example, developers can use at least some of the various embodiments to change the behavior/configuration of a computing device being tested with the piece of software.

In some embodiments, at least some of the various embodiments of the present disclosure can alter the behavior of computing devices. For example, developers can utilize the settings service to modify time out settings, implement features on the devices (e.g roll out features on some devices and roll out different features on other devices), perform A/B testing, etc.

In some embodiments, a setting can be associated with information regarding with which specific device(s) the setting is compatible. Based on the information, the setting can be applied for the appropriate device(s). In other words, in some embodiments, a setting can be associated with a plurality of versions for the setting; which one of the plurality of versions of the setting is applicable to the computing device can depend at least in part on a property of the computing device. For example, versions of a setting can be different depending on a country of residence, a preferred marketplace, or another detail/property associated with the computing device and/or with a user of the computing device. If a setting includes information that the setting is for a computing device in the United States, the setting can be applied for computing devices in the United States, whereas a computing device in Canada can be compatible with a different setting specifically compatible for Canadian computing devices. In some embodiments, an application developer can request a specific setting, and then other information/attributes (e.g country of residence, preferred marketplace, etc.) associated with a device of the application developer can be sent with the request to the backend server in order to obtain the appropriate requested setting.

In some embodiments, a setting does not need to be explicitly defined in every settings group. If the device is in (i.e belongs to) a settings group that contains a setting, then the device will receive that setting; if not, then the settings service will not send that setting to the device.

Various embodiments consistent with the present disclosure can also be implemented utilizing namespaces. In some embodiments, the settings can be associated with namespaces such that there can be a limit as to which applications have visibility into which settings (e.g a limit as to which apps can access which settings). By specifying that one setting is specific to the home screen process and another setting is specific to the email application, for example, the home screen process can only access, or have visibility into, the home screen setting. Further, the email application can only access the other setting specific to the email application. In some embodiments, settings can kept as global or default settings, while some settings can be non-global (and be associated with namespaces). In some embodiments, an application can request a setting, and namespacing can be applied automatically to the setting.

In some embodiments, an application developer can specify, in code, a default setting for an application. The specified default setting can be overridden by a default setting stored in the database (i.e central repository) on the device. The database can be updated with settings retrieved from the backend server. In one example, an application requiring the setting can seamlessly receive the setting from a backend server or, if no setting was retrieved, can fall back to the default setting in the database or specified in the code.

Figure 7:
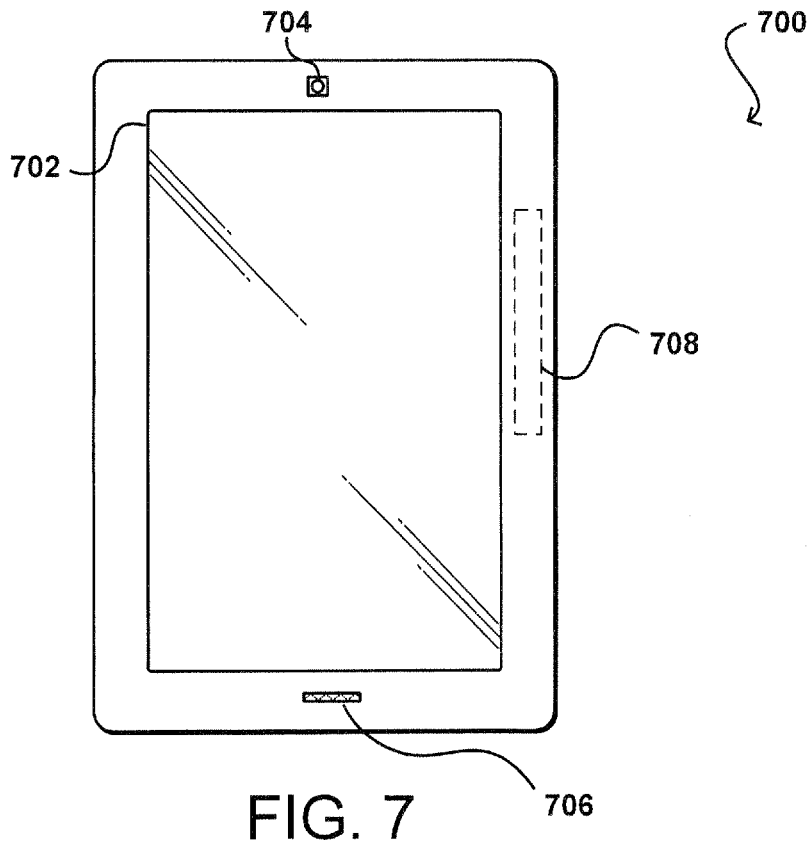
FIG. 7 illustrates an example device that can be used to implement aspects of the various embodiments.

FIG. 7 illustrates an example electronic user device 700 that can be used in accordance with various embodiments. Although a portable computing device (e.g an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g north or south) in which the device is determined to be pointing (e.g with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
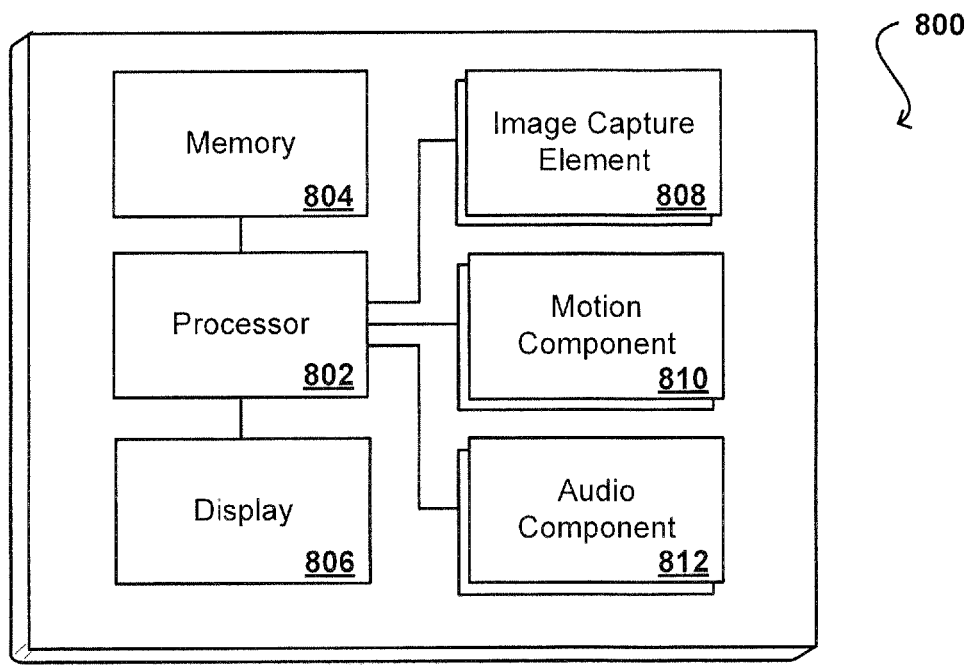
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g sending a message or creating a document), user behavior (e.g how often a user performs a task, the amount of time a user spends on a task, the ways in which a user navigates through an interface, etc.), user preferences (e.g how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
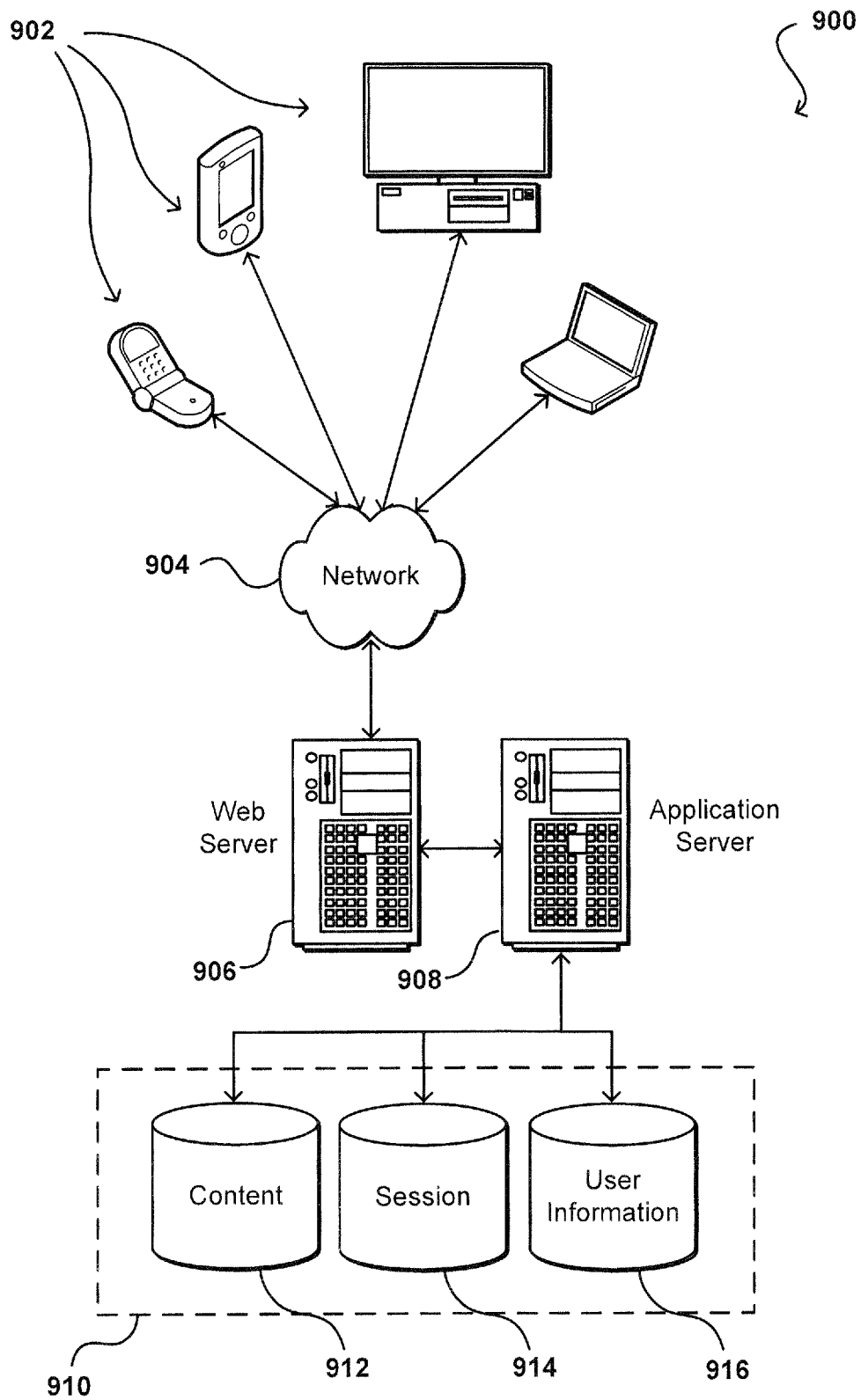
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g a mouse, keyboard, controller, touch screen, or keypad), and at least one output device (e.g a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for remotely managing device settings, comprising:
   receiving, by a remote server, a request for settings to be applied to a computing device;
   determining, by the remote server, an identifier for the computing device based at least in part upon the request;
   determining, by the remote server, a first plurality of settings to apply to the computing device based at least in part on the identifier, the first plurality of settings includes at least one setting that is accessible to a first application and a second application of the computing device, and that is inaccessible to a third application of the computing device;
   determining, by the remote server, at least one conflict between the at least one setting and at least one of default setting of a second plurality of settings;
   determining, by the remote server, at least one resolved setting by resolving the at least one conflict;
   determining, by the remote server, a third plurality of settings that includes the at least one resolved setting, one or more settings of the first plurality of settings different than the at least one setting, and one or more default settings of the second plurality of settings different than the at least one default setting; and
   transmitting, by the remote server, the third plurality of settings to the computing device in response to the request.

2. The computer-implemented method of claim 1, wherein the request is associated with at least one of a periodic poll for updated settings, an application initiated request, or a user initiated request.

3. The computer-implemented method of claim 1, wherein the first plurality of settings includes at least one setting associated with a first key and a first value and the second plurality of settings includes at least one setting associated with a second key and a second value, wherein determining the at least one conflict is based on a determination that the first key matches the second key, and wherein resolving the at least one conflict is based on a selection of the first value or the second value as a third value for the at least one resolved setting.

4. A computer-implemented method comprising:
   identifying, by a remote server, a first plurality of settings associated with a computing device, the first plurality of settings includes at least one setting that is accessible to a first application of and a second application of the computing device and that is inaccessible to a third application of the computing device;
   determining, by the remote server, at least one conflict between the at least one setting of and at least one default setting of a second plurality of settings;
   determining, by the remote server, at least one resolved setting by resolving the at least one conflict;
   determining, by the remote server, a third plurality of settings that includes the at least one resolved setting, one or more first settings of the first plurality of settings different than the at least one setting, and one or more default settings of the second plurality settings; and transmitting, by the remote server, the third plurality of settings to the computing device.

5. The computer-implemented method of claim 4, further comprising:
   implementing a namespace for the at least one setting of the first plurality of settings to prevent the third application from accessing the at least one setting.

6. The computer-implemented method of claim 4, further comprising:
   transmitting to the computing device a request to select between a first value for the at least one setting of the first plurality of settings or a second value for the at least one default setting of the second plurality of settings to resolve the at least one conflict.

7. The computer-implemented method of claim 4, further comprising:
   transmitting a push notification to indicate an availability of the third plurality of settings.

8. The computer-implemented method of claim 4, further comprising:
   determining that one or more settings of the first plurality of settings or one or more default settings of the second plurality of settings have been updated.

9. The computer-implemented method of claim 4, further comprising:
   receiving, from the computing device, a request for settings to be applied to the computing device.

10. The computer-implemented method of claim 9, wherein the request is associated with at least one of a periodic poll for updated settings, an application initiated request, or a user initiated request.

11. The computer-implemented method of claim 4, further comprising:
    determining a more recently updated setting for resolving the at least one conflict.

12. The computer-implemented method of claim 4, further comprising:
    determining at least one of a setting or an operational state of the computing device for automatic transmission of the third plurality of settings to the computing device.

13. The computer-implemented method of claim 4, wherein at least one of the first application, the second application, or the third application caches at least a subset of the third plurality of settings.

14. A system comprising:
    a processor; and
    a memory device including instructions that, when executed by the processor, cause the system to:
        identify a first plurality of settings associated with a computing device, the first plurality of settings includes at least one setting that is accessible to a first application and a second application of the computing device, and that is inaccessible to a third application of the computing device;
        determine at least one conflict between the at least one setting and at least one default setting of a second plurality of settings;
        determine at least one resolved setting by resolving at least one conflict;
        determine a third plurality of settings that includes the at least one resolved setting, one or more settings of the first plurality of settings different than the at least one setting, and one or more default settings of the second plurality of settings different than the at least one default setting; and
        transmit the third plurality of settings over a network to the computing device.

15. The system of claim 14, further comprising:
    a central repository configured to store settings applicable to a plurality of computing devices.

16. The system of claim 14, wherein at least one of the first application, the second application, or the third application caches at least a subset of the third plurality of settings.

17. The system of claim 14, further comprising:
    a setting database configured to store the second plurality of settings.

18. The system of claim 14, wherein the instructions upon being executed further cause the system to:
    implement a namespace for the at least one setting of the plurality of settings to prevent the third application from accessing the at least one setting.

19. The system of claim 14, wherein the instructions upon being executed further cause the system to:
    determine that one or more settings of the first plurality of settings or one or more default settings of the second plurality of settings have been updated.

20. A non-transitory computer-readable storage medium including instructions that, upon being executed by a processor of a computing system, cause the computing system to:
    identify a first plurality of settings associated with a computing device, the first plurality of settings includes at least one setting that is accessible to a first application and a second application of the computing device, and that is inaccessible to a third application of the computing device;
    determine at least one conflict between the at least one setting and at least one default setting of a second plurality of settings;
    determine at least one resolved setting by resolving the at least one conflict;
    determine a third plurality of settings that includes the at least one resolved setting, one or more settings of the first plurality of settings different than the at least one setting, and one or more default settings of the second plurality of settings different than the at least one default setting; and
    transmit the third plurality of settings over a network to the computing device.

21. The non-transitory computer-readable storage medium of claim 20, wherein the instruction upon being executed further cause the computing system to:
    determine one or more setting of the first plurality of settings or the second plurality of settings have been updated.

22. The non-transitory computer-readable storage medium of claim 20, wherein the instructions upon being executed further cause the computing system to:
    receive, from the computing device, a request for one or more settings to be applied to the computing device.

23. The non-transitory computer-readable storage medium of claim 20, wherein the first plurality of settings includes at least one setting associated with a first key and a first value and the second plurality of settings includes at least one setting associated with a second key and a second value, and
    wherein the instructions to determine the at least one conflict further cause the computing system to determine the at least one conflict based on the first key matching the second key, and wherein a resolution of the at least one conflict is based on a selection of the first value or the second value as a third value for the at least one resolved setting.

24. The non-transitory computer-readable storage medium of claim 20, wherein the instructions upon being executed further cause the computing system to:
transmit to the computing device a request to select between a first value for the at least one setting of the first plurality of settings or a second value for the at least one default setting of the second plurality of settings to resolve the at least one conflict.

25. The non-transitory computer-readable storage medium of claim 20, wherein the instructions upon being executed further cause the computing system to:
determine at least one of a setting or an operational state of the computing device for automatic transmission of the third plurality of settings.

* * * * *